US007933410B2

(12) United States Patent
Fahrny

(10) Patent No.: US 7,933,410 B2
(45) Date of Patent: Apr. 26, 2011

(54) SYSTEM AND METHOD FOR A VARIABLE KEY LADDER

(75) Inventor: James William Fahrny, Pueblo, CO (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 990 days.

(21) Appl. No.: 11/058,894

(22) Filed: Feb. 16, 2005

(65) Prior Publication Data

US 2006/0184796 A1    Aug. 17, 2006

(51) Int. Cl.
*G06F 21/00* (2006.01)
*H04L 9/00* (2006.01)
(52) U.S. Cl. ............... 380/201; 380/42; 380/44; 726/26
(58) Field of Classification Search ......................... None
See application file for complete search history.

(56) References Cited

U.S. PATENT DOCUMENTS

| | | | |
|---|---|---|---|
| 4,792,973 A | 12/1988 | Gilhousen et al. | |
| 4,860,353 A | 8/1989 | Brown | |
| 5,054,067 A | 10/1991 | Moroney et al. | |
| 5,200,999 A * | 4/1993 | Matyas et al. | ................. 380/277 |
| 5,671,276 A | 9/1997 | Eyer et al. | |
| 5,734,720 A | 3/1998 | Salganicoff | |
| 5,784,095 A | 7/1998 | Robbins et al. | |
| 5,982,363 A | 11/1999 | Naiff | |
| 6,157,719 A | 12/2000 | Wasilewski et al. | |
| 6,271,837 B1 | 8/2001 | Naiff | |
| 6,424,717 B1 * | 7/2002 | Pinder et al. | ................... 380/239 |
| 6,748,080 B2 | 6/2004 | Russ et al. | |
| 6,898,285 B1 | 5/2005 | Hutchings et al. | |
| 6,944,083 B2 * | 9/2005 | Pedlow, Jr. | ................... 365/225.7 |
| 6,976,163 B1 | 12/2005 | Hind et al. | |
| 7,069,452 B1 | 6/2006 | Hind et al. | |
| 2001/0046299 A1 | 11/2001 | Wasilewski et al. | |
| 2002/0080958 A1 * | 6/2002 | Ober et al. | ........................ 380/44 |
| 2002/0090090 A1 * | 7/2002 | Van Rijnsoever et al. | ..... 380/279 |
| 2002/0101990 A1 * | 8/2002 | Morino et al. | ................. 380/210 |
| 2002/0118837 A1 | 8/2002 | Hamilton | |
| 2002/0136406 A1 | 9/2002 | Fitzhardinge et al. | |

(Continued)

FOREIGN PATENT DOCUMENTS

WO         03043310         5/2003

OTHER PUBLICATIONS

Cunningham et al., "Secure Pay Per View Testbest", Networks and Telecommunications Research Group, Trinity College, 1995, p. 1-4.*

(Continued)

*Primary Examiner* — Michael Pyzocha
*Assistant Examiner* — Jeffery Williams
(74) *Attorney, Agent, or Firm* — Banner & Witcoff, Ltd.

(57) ABSTRACT

A method of generating encryption and decryption keys for a multiple tier, variable key ladder (VKL) hierarchy includes determining a device key based on network connection and configuration data contained in conditional access system firmware, decrypting and extracting a session or category key from an input media stream or an Entitlement Management Message using the device key, and configuring a key ladder in response to at least one Entitlement Control Message (ECM), wherein the key ladder comprises the device key and at least one of (i) a program key, (ii) the session or category key, and (iii) at least one control word.

20 Claims, 3 Drawing Sheets

U.S. PATENT DOCUMENTS

| | | | |
|---|---|---|---|
| 2002/0170054 A1 | 11/2002 | Kudelski et al. | |
| 2003/0002577 A1 | 1/2003 | Pinder | |
| 2003/0097655 A1* | 5/2003 | Novak | 725/31 |
| 2003/0123667 A1 | 7/2003 | Weber et al. | |
| 2003/0190044 A1* | 10/2003 | Higashi et al. | 380/201 |
| 2003/0219127 A1 | 11/2003 | Russ et al. | |
| 2004/0003263 A1* | 1/2004 | Brique et al. | 713/189 |
| 2004/0057579 A1 | 3/2004 | Fahrny | |
| 2004/0088558 A1* | 5/2004 | Candelore | 713/193 |
| 2004/0098591 A1 | 5/2004 | Fahrny | |
| 2004/0177369 A1 | 9/2004 | Akins, III | |
| 2004/0208316 A1 | 10/2004 | Wack et al. | |
| 2005/0010778 A1 | 1/2005 | Walmsley | |
| 2005/0058291 A1* | 3/2005 | Candelore | 380/268 |
| 2005/0063541 A1* | 3/2005 | Candelore | 380/239 |
| 2005/0100161 A1 | 5/2005 | Husemann et al. | |
| 2005/0119967 A1 | 6/2005 | Ishiguro et al. | |
| 2005/0169468 A1 | 8/2005 | Fahrny et al. | |
| 2005/0172132 A1* | 8/2005 | Chen et al. | 713/180 |
| 2005/0177741 A1* | 8/2005 | Chen et al. | 713/189 |
| 2006/0031873 A1 | 2/2006 | Fahrny et al. | |
| 2006/0122946 A1 | 6/2006 | Fahrny et al. | |
| 2006/0137015 A1 | 6/2006 | Fahrny et al. | |
| 2006/0153379 A1 | 7/2006 | Candelore et al. | |
| 2006/0200412 A1 | 9/2006 | Fahrny et al. | |
| 2007/0168048 A1* | 7/2007 | Allen et al. | 700/2 |
| 2007/0206799 A1* | 9/2007 | Wingert et al. | 380/285 |
| 2008/0086641 A1* | 4/2008 | Rodgers et al. | 713/176 |
| 2009/0323971 A1* | 12/2009 | Munguia et al. | 380/284 |

OTHER PUBLICATIONS

Tu, Laih and Tung: On Key Distribution Management for Conditional Access System on Pay-TV System, IEEE, 1999, p. 1-8.*

ANSI/SCTE 41 2003 (Formerly DVS 301 POD Copy Protection Standard.

FIPS PUB 140-2 "Security Requirements for Cryptographic Modules", May 25, 2001, http://www.itl.nist.gov/fibspubs/.

FIPS PUB 186-2, "Digital Signature Standard" Federal Information Processing Standards Publication (FIPS PUB), Jan. 27, 2000, http://www.itl.nist.gov/fibspubs/.

FIPS-PUB 180-2, "Secure Hash Standard" Federal Information Processing Standards Publication (FIPS PUB), Aug. 1, 2002, http://www.itl.nist.gov/fibspubs/.

FIPS-PUB 46-3 "Data Encryption Standard", Oct. 25, 1999 http://csrc.nist.gov/publications/fips/fips46-3/flips46-3.pdf.

FIPS-PUB 81 "DES Modes of Operation", Dec. 2, 1980; http://www.itl.nist.gov/fipspubs/fip81.htm.

IETF RFC 1750, Randomness Recommendations for Security, (Donald Eastlake, Stephen Crocker and Jeff Schiller), Dec. 1994, www.ietf.org/.

IETF RFC 2104, HMAC: Keyed-Hashing for Message Authentication, (Krawczyk, Bellare, and Canetti), Mar. 1996, www.ietf.org/.

IETF RFC 2630, Cryptographic Message Syntax, (R. Housley), Jun. 1999, www.ietf.org/.

IETF RFC 3280, "Internet X.509 Public Key Infrastructure Certificate and CRL Profile", R. Housley, W. Ford, W. Polk, D. Solo, Jan. 2002, www.ietf.org/.

RSA1, "PKCS #1: RSA Encryption Standard", Version 1.5, RSA Laboratories, Nov. 1993 2.2 Reference Acquisition, http://www.rsasecurity.com/rsalabs/pkcs/.

CableLabs Specifications, www.opencable.com, p. 1.

Hopper, Andy, A Network Striped Storage System for Video on Demand, article, http://citeseer.ist.psu.edu/26010.html.

"Explorer 4200HD Home Gateway" Copyright 2002 Scientific Atlanta Inc. http://www.sciatl.com/products/consumers/userguidepdfs/4001344.pdf.

Jim Lyle, "HDCP: what it is and how to use it" Originally Published Apr. 18, 2002 pp. 1-5, and Figures 1-6. http://www.edn.com/index.asp?layout=articlePrint&articleID=CA209091.

FCC News: Commission Adopts "Navigation Devices" Rules Creating Consumer Market for Set Top Boxes and Other Equipment Used with Video Programming Systems (CS Docket 97-80). Originally Published Jun. 11, 1998 pp. 1-3 http://www.fcc.gov/Bureaus/Cable/News_Releases/1998/nrcb8013.html.

International Preliminary Report on Patentability and Written Opinion for PCT/US06/01673, mailed Apr. 2, 2009.

* cited by examiner

SYSTEM AND METHOD FOR A VARIABLE KEY LADDER

BACKGROUND OF THE INVENTION

1. Field of the Invention

The present invention relates to a system and method for an encryption and decryption variable key ladder.

2. Background Art

Conventional implementations of media (e.g., video, audio, video plus audio, and the like) program stream delivery systems (e.g., cable, satellite, etc.) typically include cryptographic techniques such as conditional access (CA) to provide security to the media stream. There are complex legacy (i.e., conventional) CA systems that use 3 or 4 tier encryption and decryption key hierarchies which are fixed, sometimes implemented in hardware state machines and not modifiable. Such conventional CA system approaches are unable to accommodate future security needs or new business models. The conventional approaches fail to provide for increased security, flexibility in new business models, and ability to counter attacks by the hacker community.

Thus, it would be desirable to have a system and a method for an encryption and decryption variable key ladder that overcomes deficiencies of conventional approaches.

SUMMARY OF THE INVENTION

The present invention generally provides new and innovative systems and techniques for-security technology that provides for lengthening the life cycle of any conditional access (CA) system by making at least one element (e.g., a variable key ladder (VKL)) of the CA system variable and renewable. The present invention generally provides a system and method for generating encrypting and decrypting keys for multiple tier hierarchies.

According to the present invention, a method of generating encryption and decryption keys for a multiple tier, variable key ladder (VKL) hierarchy is provided. The method comprises determining a device key based on network connection and configuration data contained in conditional access system firmware, decrypting and extracting a session or category key from an input media stream or an Entitlement Management Message (EMM) using the device key, and configuring a key ladder in response to at least one Entitlement Control Message (ECM), wherein the key ladder comprises the device key and at least one of (i) a program key, (ii) the session or category key, and (iii) at least one control word.

Also according to the present invention, a system for generating encryption and decryption keys for a multiple tier, variable key ladder (VKL) hierarchy is provided. The system comprises a headend, a network, and at least one receiver. The headend is configured to generate encrypted digital input media streams. The network is coupled to the headend and configured to receive the encrypted digital input media streams. The receiver is coupled to the network and configured to receive the encrypted digital input media streams and present a decrypted version of the encrypted digital media streams. At least one of the headend and the at least one receiver comprises a security processor. The security processor is configured to determine a device key based on network connection and configuration data contained in conditional access system hardware or firmware, decrypt and extract a session or category key from an Entitlement Management Message (EMM) using the device key, decrypt and extract at least one of (i) a program key and (ii) at least one control word from an Entitlement Control Message (ECM) in the input media stream, and configure a key ladder in response to the at least one control word, wherein the key ladder comprises the device key and at least one of (i) the program key, (ii) the session or category key, and (iii) the at least one control word.

Further, according to the present invention, a processor for digital media security processing is provided. The processor comprises a selector for determining a device key based on network connection and configuration data contained in conditional access system firmware, a decryption operator for decrypting and extracting a session key from an input media stream using the device key, and at least one multiplexer for configuring a key ladder in response to at least one control word, wherein the key ladder comprises the device key and at least one of (i) a program key, (ii) the session key, and (iii) the at least one control word.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
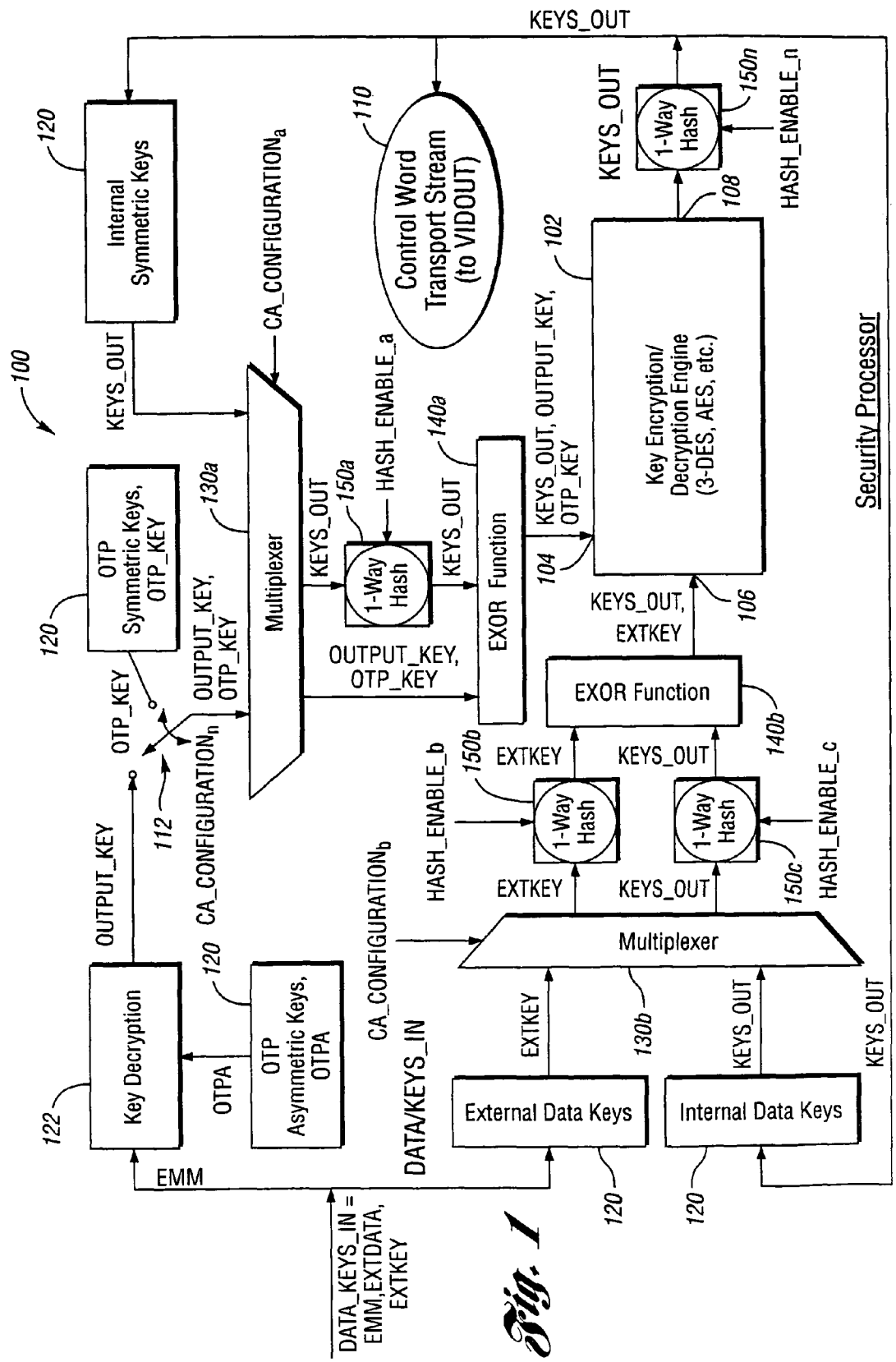
FIG. 1 is a diagram of a variable key ladder generation processor of the present invention.

With reference to the Figures, the preferred embodiments of the present invention will now be described in detail. In one example, the present invention may be implemented in connection with a cable television transmission and reception system. In another example, the present invention may be implemented in connection with a digital broadcast satellite (i.e., "dish") television transmission and reception system (not shown). However, the present invention may be implemented in connection with any appropriate media stream transmission and reception system to meet the design criteria of a particular application.

In the description below, these terms may be defined as follows:

Access: The ability and structure (i.e., hardware, software, firmware, etc.) to communicate with or otherwise interact with a system in order to use system resources to either handle information or gain knowledge of the information the system contains. A specific type of interaction between a subject and an object that results in the flow of information from one to the other. Any ability to communicate with a system, including one-way communication in either direction. In actual practice, however, entities outside a security perimeter that can receive output from the system but cannot provide input or otherwise directly interact with the system, might be treated as not having "access" and, therefore, be exempt from security policy requirements, such as the need for a security clearance.

Access control: Protection of system resources against unauthorized access. A process by which use of system resources is regulated according to a security policy and is permitted by only authorized entities.

AES: Advanced Encryption Standard. AES is generally a much more secure algorithm to use for the storing of digital content in a digital video recording when compared to DES. AES is a symmetric 128-bit block data encryption technique. AES works at multiple network layers simultaneously.

ASIC: Application Specific Integrated Circuit. A dedicated (i.e., designed for a particular application) microprocessor/micro-controller.

CAS: Conditional Access System (or Software)

CHAP: Challenge Handshake Authentication Protocol, a type of authentication in which the authentication agent (typically a network server) sends the client program a random value that is used only once and an ID value. Both the sender and peer share a predefined secret. The peer concatenates the random value (or nonce, i.e., value used for the one or single occasion, the present call, or purpose), the ID and the secret and calculates a one-way hash (e.g., using MD5 or other hash algorithm). The hash value is sent to the authenticator, which in turn builds that same string on its side, calculates the MD5 sum itself and compares the result with the value received from the peer. When the values match, the peer is authenticated. By transmitting only the hash, the secret can not be reverse-engineered. The ID value is increased with each CHAP dialogue to protect against replay attacks.

Control Word (see also, Working Key): The key used in program encrypt/decrypt operations.

Cryptographic key: Usually shortened to just "key". An input parameter (or value) that varies the transformation performed by a cryptographic algorithm. A sequence of symbols that controls the operations of encipherment and decipherment. When a key value is to be kept secret, the sequence of symbols (usually bits) that comprise the key should be random, or at least pseudo-random, because that makes the key more difficult for an adversary (e.g., hacker, thief, etc.) to determine.

DBS: Direct Broadcast Satellite (or System)

DES: Data Encryption Standard. A fixed-key-length security algorithm that employs 56-bit length keys. Any 56-bit number can be implemented as a DES key. The relatively short key length renders DES vulnerable to brute-force attack wherein all possible keys are tried one by one until the correct key is encountered (i.e., the key is "broken").

DRM: Digital Rights Management. A system for protecting the rights of data circulated via the Internet or other digital media (e.g., satellite transmissions, cable distributions, and the like) by performing at least one of enabling secure distribution and disabling illegal distribution of the data. Typically, a DRM system protects intellectual property by either encrypting the data so that it can only be accessed by authorized users or marking the content with a digital watermark or similar method so that the content can not be freely distributed.

Electronic Code Block (Mode): ECB, In ECB the message is divided into 64-bit blocks, and each block is encrypted separately. Encryption is independent for each block.

Entitlement Control Message (Stream): ECM, Messages that generally define access requirements of a program, specify the tiers required for subscription, and the cost associated with impulse purchase of the program. The index may be delivered in the ECM as a reference to the content key. Encrypted program keys may be delivered in the ECM stream.

Entitlement Management Message (Stream): EMM, Messages that define access rights for each individual decoder. The EMM stream is processed with the access control device; however, the user processor buffers EMMs and feeds the EMMs to the access control device via an interface. The EMM contains a symmetric key typically referred to as a session key or category key.

Hash: A function (or process) that converts an input (e.g., the input stream) from a large domain into an output in a smaller set (i.e., a hash value, e.g., the output stream). Various hash processes differ in the domain of the respective input streams and the set of the respective output streams and in how patterns and similarities of input streams generate the respective output streams. One example of a hash generation algorithm is Secure Hashing Algorithm-1 (SHA-1). Another example of a hash generation algorithm is Message Digest 5 (MD5). The hash may be generated using any appropriate algorithm to meet the design criteria of a particular application.

Headend: The control center of a cable (or other) centralized media (e.g., television) system, where broadcast signals are received and distributed. The headend generally contains antennas, preamplifiers, frequency converters, demodulators, encoders, compressors, automatic switching equipment and other related equipment that receives, amplifies, filters, encrypts, encodes, and converts incoming satellite and terrestrial streams for presentation to distribution channels.

Initialization vector: IV, An initialization vector in a block cipher is a block of bits that is combined with the first block of data in any of several feedback modes. The IV will make each cipher text unique, even when similar plain text is encrypted with the same key in chain block coding (CBC) mode.

IPPV: Impulse Pay Per View

Keylist: A list of decoder addresses and respective decoder keys in ordered pairs. Keylists may be used by the Uplink Control System (UCS) for generation of authorization messages that are addressed to the diagnostic circuit that is embedded in decoders that are specific to the encoder system.

Kernel: The central module of an operating system. It is the part of the operating system that loads first, and it remains in main memory. Because it stays in memory, it is important for the kernel to be as small as possible while still providing all the essential services required by other parts of the operating system and applications. Typically, the kernel is responsible for memory management, process and task management, and disk management.

Key: A password or table used to decipher encoded/encrypted data.

Media: Plural of medium. The form and technology used to communicate information. Multimedia presentations, for example, combine sound, pictures, and videos, all of which are different types of media.

Middleware: Software that connects two otherwise separate applications. For example, there are a number of middleware products that link a database system to a Web server. The middleware allows users to request data from the database using forms displayed on a Web browser, and enables the Web server to return dynamic Web pages based on the user's requests and profile. The term middleware is used to describe separate products that serve as the glue between two applications. Middleware is, therefore, distinct from import and export features that may be built into one of the applications. Middleware is sometimes called plumbing because it connects two sides of an application and passes data between them.

MSO: Multiple System Operator

Nonce: A random value that is used only once. The nonce cryptographically binds a request and a response to prevent replay attacks.

OTP: One Time Programmable/Password

Password: A secret series of characters that enables a user to access a file, computer, program, media stream, and the like. May be implemented in combination with or in connection with encryption/decryption.

PID: Program Identification/Identifier

PKI: Public-key Infrastructure. A system of certification authorities (and, optionally, registration authorities and other supporting servers and agents) that perform some set of certificate management, archive management, key management, and token management functions for a community of users in an application of asymmetric cryptography. The core PKI functions are (a) to register users and devices and issue their public-key certificates, (b) to revoke certificates when required, and (c) to archive data needed to validate certificates at a much later time. Key pairs for data confidentiality may be generated (and perhaps escrowed) by certification authorities or registration authorities, but requiring a PKI client to generate its own digital signature key pair helps maintain system integrity of the cryptographic system, because then only the client ever possesses the private key it uses. Also, an authority may be established to approve or coordinate CPSs, which are security policies under which components of a PKI operate. A number of other servers and agents may support the core PKI, and PKI clients may obtain services from them. The full range of such services is not yet fully understood and is evolving, but supporting roles may include archive agent, certified delivery agent, confirmation agent, digital notary, directory, key escrow agent, key generation agent, naming agent who ensures that issuers and subjects have unique identifiers within the PKI, repository, ticket-granting agent, and time stamp agent.

Program: A time contiguous collection of motion image information, audio information, or a combination thereof that is generally transmitted (i.e., presented, broadcast, sent, delivered, etc.) as an entity.

Program Key: An encryption/decryption key that controls access, encryption/decryption, etc. of a particular program.

RSA: A public-key encryption technology developed by RSA Data Security, Inc. The acronym stands for Rivest, Shamir, and Adelman, the inventors of the technique. The RSA algorithm is based on the fact that there is no efficient way to factor very large numbers. Deducing an RSA key, therefore, requires an extraordinary amount of computer processing power and time. RSA may be implemented connection with key management, multiple key management, digital signatures, and the like.

Smart card: A small electronic device about the size of a credit card that contains electronic memory, and possibly an embedded integrated circuit (IC). Smart cards containing an IC are sometimes called Integrated Circuit Cards (ICCs). Smart cards are used for a variety of purposes, including generating network IDs (similar to a token).

SSO: System Sign On

Symmetric encryption: A type of encryption where the same key is used to encrypt and decrypt the message. This differs from asymmetric (e.g., public-key) encryption, which uses one key to encrypt a message and another to decrypt the message.

Token: In security systems, a small device the size of a credit card that displays a constantly changing ID code. A user first enters a password and then the card displays an ID that can be used to log into a network. Typically, the IDs change every 5 minutes or so. A similar mechanism for generating IDs is a Smartcard or, for cable installations, a Cablecard.

Triple-DES: (3-DES) Application of DES encryption three times using three different keys or, alternatively, using a one key for the first and third segments of a three segment key and a second key for the middle segment, for a total key bit-width of 112 or 168 bits is also used to protect certain structures and the key inside entitlements.

Unit address: A unique number that identifies and distinguishes one decoder from another. One example of a unit address is a Media Access Control (MAC).

Unit key (or Private key): A key that is unique to a respective decoder. Messages intended for a particular decoder are encrypted using the respective unit key.

Unit keylist: A file that contains unit addresses and respective unit keys.

Uplink Control System (UCS): Software that is used to support the secure delivery of digitally compressed services. The UCS generally provides the capability to authorize and de-authorize individual decoders on an event-by-event basis.

URL: Uniform Resource Locator (World Wide Web address)

VOD: Video On Demand

Working key: A low level key that generally changes several times per second. The working key generally has a validity that is equal to or shorter in duration than the program to which it is related. The working key is also referred to as the "control word." In one typical example, the working key changes every 20 to 30 seconds. In one example (e.g., services that do not have a video component), the working key epoch (i.e., the period of time during a program for which a working key is valid) duration may be set at an appropriate time interval. However, any appropriate time for changing the working key may be implemented to meet the design criteria of a particular application. The working key is used to derive the keystream. The working key is generally delivered in an encrypted form with the respective program key.

Working Key File: A file that contains the working keys for the entire program that is encrypted in the program key, generally in chronological order.

The system and method for a variable key ladder (VKL) of the present invention is generally implemented in connection with a media stream transmission and reception system. Such a media stream transmission and reception system may be implemented, in one example, as shown in detail in connection with FIGS. 2(a-b) below. However, the present invention may be implemented in connection with any appropriate media stream transmission and reception system to meet the design criteria of a particular application.

As used herein, the term "key" generally refers to an encryption/decryption key. The present invention is generally implemented as a hardware accelerated system and a method for decrypting and encrypting keys for multiple tier key hierarchies. In contrast, conventional approaches for key systems are fixed when hardware acceleration is used.

The system and method of the present invention generally provides for implementation of a variable key ladder (VKL) for use in cable systems. The VKL may have the number of tiers reduced or, alternatively, increased based on system design criteria and the desire for various levels of security when compared to the fixed three (3) or four (4) tier key ladder implementations of conventional approaches.

Conventional approaches generally fail to provide the ability to increase security, flexibility and ability to counter attacks by the hacker community that is provided via the Variable Key Ladder of the present invention. The present invention generally provides, through security technology, that the life cycle of any conditional access system (CAS) may be lengthened by making at least one element of the system variable and renewable. The Variable Key Ladder (VKL) of the present invention generally supports incumbent (i.e., existing, legacy, previously implemented, etc.) CASs while also providing for newer larger or smaller key ladders.

The commercial value of the Variable Key Ladder may be very large since the present invention may support the computer and consumer electronics (CE) industry to innovate new types of streaming services for multiple system operators (MSOs), and all CE and computer companies are potential customers. The present invention may lower the overall cost of managing head-ends, set top boxes and digital televisions, lower the cost and ease the operational complexities for Broadcast, Streaming Media, and video on demand (VOD) applications, thereby providing significant cost savings to the MSOs. By enabling dramatically lower costs as well as increased performance, innovation and new business models, the Variable Key Ladder, as a part of the security processor, will generally improve the competitive position of cable media stream distribution systems versus alternative video providers such as digital broadcast system (DBS) and emerging telecommunication-based video systems.

Referring to FIG. 1, a diagram illustrating a security processor 100 of the present invention is shown. The security processor 100 generally provides for a variable key ladder that can be started with a symmetric key or an asymmetric key (both symmetric keys and asymmetric keys are implemented in existing CA systems). When the selectable symmetric or asymmetric key is used to decrypt an Entitlement Management Message (EMM) or to decrypt substantially the same access rights, the symmetric key is generally extracted from the EMM (or rights) to start the variable key ladder. The size of the key ladder may be unlimited (i.e., the key ladder size is variable) and the keys for various levels may be sourced from many different data structures unlimited (i.e., the key ladder structure is also variable) in a media stream system.

The VKL security processor 100 may be configured to operate with devices using symmetric keys or asymmetric keys at the device level that are typically used to decrypt EMMs to validate entitlements and to extract the session or category key. Based on the network connection and configuration data when the CAS firmware is loaded, the VKL may be configured substantially at start-up time to utilize either symmetric or asymmetric keys for the device key as shown in FIG. 1.

CAS firmware loaded into the processor 100 may also be able to configure the VKL processor 100 for the size of the key ladder. The number of symmetric keys may be set (i.e., selected, established, predetermined, etc.) from zero to N, where N is any number, based upon the system of CA being run on the network where the processor 100 is implemented. Conventional CA systems typically use 3 to 4 tiers of keys including the control word or program key.

The category or session key may be implemented as a symmetric key used in a chain of keys based upon the selected size of the key ladder. Each key is generally used to decrypt the next key in the chain. Each of the keys in the chain may be the result of a hash of the key and/or input data that is fed into the VKL as well. The final result of the processing performed via the processor 100 is generally a control word (or working key), which will generally be used to decrypt the transport stream for the channel or service tier in the system where the processor 100 is implemented that is traversed to obtain the key.

The system and method of the present invention may be implemented in many ways, and may be implemented in connection with any appropriate media stream security processing system to meet the design criteria of a particular application. Both triple DES and AES algorithms may be implemented to meet system criteria. Selection of triple DES and AES algorithms may be selectable using hardware registers. Combinations of symmetric and asymmetric keys may be implemented on varying tiers of the key ladder generated using the system and method of the present invention. Due to the slower decryption times and key generation times for asymmetric keys, in one example, asymmetric keys may be practicably implemented only the first tier of the key ladder.

The VKL of the present invention is generally a cryptographic method to ensure high level content security while providing large flexibility in key management techniques used to secure the content keys and entitlements for various types of content. The conventional CA systems that use 3 or 4 tier key hierarchies which are fixed, sometimes in hardware, and not modifiable are generally not suitable for future security needs or new business models. When content is placed on centralized streaming servers or delivered in real-time, the present invention generally provides a cryptographic method that may ensure that MSOs have the greatest flexibility in securing content and entitlements and can also counter a number of security attacks. In addition to supporting the fixed legacy (i.e., conventional) systems, the variable key ladder of the present invention also allows the implementation of an unlimited number of stages of keys in a new CA system.

The VKL of the present invention generally provides a new, more flexible, equally secure, and simplified method to deliver specialized keys and entitlement or license files for decrypting content and program streams in media stream (e.g., video) CAS and On Demand applications when compared to conventional approaches. The new key management of the present invention dramatically increases security flexibility, performance and strength in the security processor. The VKL system of the present invention generally ensures that legacy CA systems and new stronger CA systems are supported.

The VKL system of the present invention generally provides for far more efficient distribution and operations of certain types of content for broadcast, on demand, and streaming applications than conventional approaches. The VKL system of the present invention generally provides for flexibility and can assist in the simplification of the Impulse Pay Per View (IPPV) and Video On Demand (VOD) security of the media stream distribution system.

The security processor 100 generally comprises a key encryption/decryption engine 102 that may have an input 104 that may receive keys (e.g., KEYS_OUT, OUTPUT_KEY, and OPT_KEY), an input 106 that may receive keys (e.g., KEYS_OUT, EXTKEY), and an output 108 that may present keys (e.g., KEYS_OUT) as a control word to an output media stream 110 (e.g., to a media stream VIDOUT). The engine 102 may further (i.e., optionally or alternatively) present the keys KEYS_OUT via a hash (e.g., a hash 150n). The processor 100 is generally implemented in connection with network connection and configuration data contained in conditional access system (CAS) firmware.

The processor 100 generally implements at least one selector (e.g., switch) 112, encryption key sources 120 (e.g., keys generated by or stored at devices 120a-120n), at least one decryption operator (e.g., a device configured to perform at least one decryption operation, method, process, routine, algorithm, steps, blocks, software/firmware program, etc.) 122, one or more multiplexers 130 (e.g., multiplexers 130a and 130b), at least one exclusive OR (EXOR) operator (e.g., logic gate, programmed logic, etc.) 140 (e.g., EXOR 140a and EXOR 140b), and at least one hash operator 150 (e.g., hash 150a-150n). (e.g., an operator using SHA-1 or other hash algorithm). The processor 100 generally receives encryption/decryption keys in connection with an input media stream (e.g., a signal DATA/KEYS_IN) and presents encryption/decryption keys (e.g., the signal KEYS_OUT).

The encryption/decryption keys are generally contained (i.e., held, stored, programmed, etc.) in a respective source (i.e., register, memory, RAM, Flash, firmware, etc.) 120. The selector 112 and the multiplexers 130 generally select an appropriate key in response to a respective control signal (e.g., CA_CONFIGURATIONa-CA_CONFIGURATIONn). The hash operators 150 are generally enabled to perform a respective one-way hash operation in response to a respective control signal (e.g., HASH_ENABLE_- HASH_ENABLE_n). The decryption operator 122 generally implements at least one decryption process such as RSA, AES, 3-DES, and the like. The control signals CA_CONFIGURATION and the signal HASH_ENABLE generally establish the encryption/decryption key structure and configuration of the VKL.

The signal DATA/KEYS_IN generally comprises a digital media stream having at least one entitlement management message (e.g., EMM), external data (e.g., EXTDATA), and at least one external encryption/decryption key (e.g., EXTKEY). OUTPUT_KEY generally comprises at least one of a key from the message EMM (which may include at least one symmetric key in connection with a headend download) and a one time programmed/programmable (OTP) asymmetric key (e.g., OTPA) that is presented by a source 120. The data EXTDATA may be media stream data (i.e., information).

The key decryption operator 122 generally receives the signal (e.g., media stream) DATA/KEYS_IN that includes the message EMM, and an OTP asymmetric key (e.g., the key OTPA from a respective register 120). The decryption operator 122 generally decrypts the EMM in response to the key OTPA to generate the key OUTPUT_KEY, and presents the signal OUTPUT_KEY to a first input of the selector 112. A second input of the selector 112 generally receives a OTP symmetric key (e.g., the key OTP_KEY from a respective register 120). The selector 112 generally presents the signal OUTPUT_KEY or the signal OTP_KEY as a device key to a first input of the multiplexer 130a in response to the control signal CA_CONFIGURATIONn. The key OTPA may be based on network connection and configuration data.

The multiplexer 130a may have a second input that may receive an internal symmetric key (e.g., the key KEYS_OUT from a respective register 120). In response to the control signal CA_CONFIGURATIONa, the multiplexer 130a may present at least one of the signals OUTPUT_KEY and OTP_KEY, and the signal KEYS_OUT to the EXOR operator 140a. The signal KEYS_OUT may further (i.e., optionally or alternatively) be hashed via the hash operator 150a in response to the control signal HASH_ENABLE_a. The EXOR operator 140a may present at least one of the signals (i.e., keys) OUTPUT_KEY, OTP_KEY, and KEYS_OUT to the input 104 of the engine 102.

The multiplexer 130b may have a first input that may receive the signal (i.e., key) EXTKEY that is presented via the signal (e.g., media stream) DATA/KEYS_IN via a respective register 120. The multiplexer 130b may have a second input that may receive the signal (i.e., key) KEYS_OUT via a respective register 120. In response to the control signal CA_CONFIGURATIONb, the multiplexer 130b may present at least one of the signal EXTKEY and the signal KEYS_OUT to the EXOR operator 140b. The signals EXTKEY and KEYS_OUT may further (i.e., optionally or alternatively) be hashed via the respective hash operators 150b and 150c in response to the respective control signals HASH_ENABLE_b and HASH_ENABLE_c. The EXOR operator 140b may present at least one of the signals (i.e., keys) EXTKEY and KEYS_OUT to the input 106 of the engine 102.

The engine 102 may generate the signal (i.e., keys) KEYS_OUT in response to at least one of the signals (i.e., keys) OUTPUT_KEY, OTP_KEY, EXTKEY and KEYS_OUT. The signal (i.e., keys) KEYS_OUT may further (i.e., optionally or alternatively) be hashed via the respective hash operator 150n in response to the respective control signal HASH_ENABLE_n. The signal (i.e., keys) KEYS_OUT may be configured as variable key ladders. The configuration (e.g., size such as the number of keys (number of tiers) and the bit-counts of the keys, type of keys such as symmetric and asymmetric, implementation of hash on components of the keys, etc.) of the VKL KEYS_OUT may be generated in response to at least one of the control signals CA_CONFIGURATION and HASH_ENABLE.

The control signals CA_CONFIGURATION and HASH_ENABLE are generally predetermined. The control signals CA_CONFIGURATION and HASH_ENABLE may be implemented in connection with firmware (e.g., in conditional access firmware, in a set top box or receiver that is implemented in connection with the security processor 100), downloaded (e.g., during a supervisory mode of operation), and the like. At least one of the keys OUTPUT_KEY, OTP_KEY, EXTKEY and KEYS_OUT may be implemented as a session key, or, alternatively referred to, as a category key. The key KEYS_OUT may be used as a control word to encrypt/decrypt the media stream VIDOUT.

The security processor 100 may chain at least one of the keys OUTPUT_KEY, OTP_KEY, EXTKEY and KEYS_OUT with at least one other of the keys OUTPUT_KEY, OTP_KEY, EXTKEY and KEYS_OUT to generate a multi tier key hierarchy (i.e., a VKL) KEYS_OUT. The security processor 100 may implement at least one of DES and AES algorithms, or, alternatively, any other appropriate symmetric key block cipher algorithm in connection with the engine 102 and the decryption operator 122. The variable key ladder generated using the processor 100 (e.g., KEYS_OUT) generally comprises the device key and at least one of (i) the program key, (ii) the session key, and (iii) at least one control word.

Figure 2A:
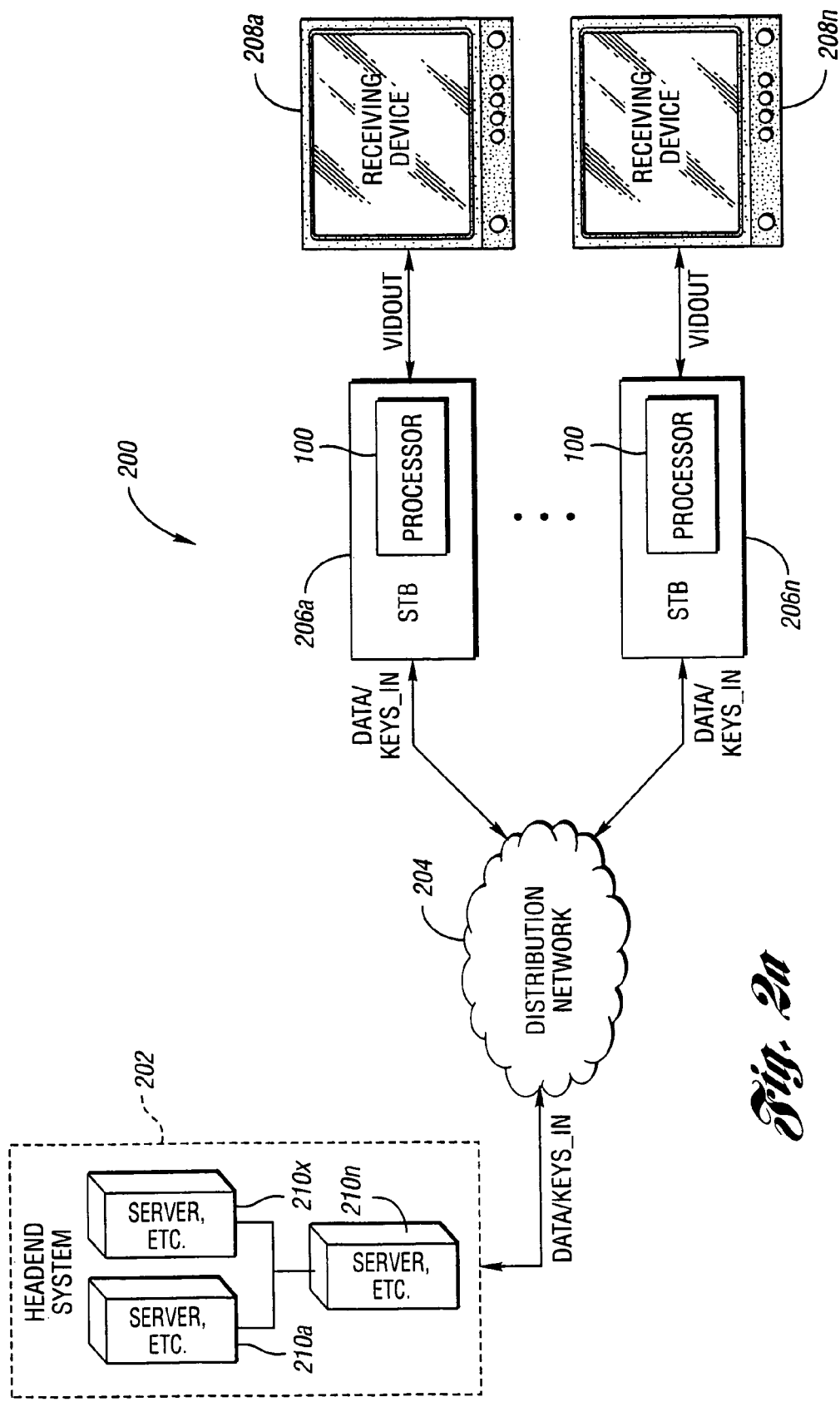
FIGS. 2(a-b) are diagrams of systems implementing the processor of FIG. 1.

Referring to FIG. 2a, a diagram illustrating a media stream processing and distribution system 200 implemented in connection with the present invention is shown. The distribution system 200 generally comprises a headend 202, a network 204, at least one set top box (STB) 206 (generally a plurality of STBs 206a-206n), and at least one respective receiving device (i.e., receiver, transceiver, display device, etc.) 208 (generally a plurality of devices 208a-208n). The distribution system 200 is generally implemented as a media service provider/subscriber system wherein the provider (or vendor) generally operates the headend 202 and the network 204, and also provides a subscriber (i.e., client, customer, service purchaser, user, etc.) with the STB 206.

The STB 206 is generally located at the subscriber location (not shown, e.g., home, tavern, hotel room, business, etc.) and the receiving device 208 is generally provided by the client. The device 208 is generally implemented as a television, high definition television (HDTV), monitor, host viewing device, MP3 player, audio receiver, radio, personal computer, media player, digital video recorder, game playing device, etc. The device 208 may be implemented as a transceiver having interactive capability in connection with the STB 206, the headend 202, or both the STB 206 and the headend 202.

The headend 202 is generally electrically coupled to the network 204, the network 204 is generally electrically coupled to the STB 206, and each STB 206 is generally electrically coupled to the respective device 208. The electrical coupling may be implemented as any appropriate hardwired (e.g., twisted pair, untwisted conductors, coaxial cable, fiber optic cable, hybrid fiber cable, etc.) or wireless (e.g., radio frequency, microwave, infrared, etc.) coupling and protocol (e.g., HomePlug, HomePNA, IEEE 802.11(a-b), Bluetooth, HomeRF, etc.) to meet the design criteria of a particular application. While the distribution system 200 is illustrated showing one STB 206 coupled to a respective one device 208, each STB 206 may be implemented having the capability of coupling more than one device 208 (not shown).

The headend 202 generally comprises a plurality of devices 210 (e.g., devices 210a-210n) that are implemented as amplifiers, pre-amplifiers, data servers, computers, processors, security encryption and decryption apparatuses or systems, and the like configured to provide video and audio data (e.g., movies, music, television programming, and the like), processing equipment (e.g., provider operated subscriber account processing servers), television service transceivers (e.g., transceivers for standard broadcast television and radio, digital television, HDTV, audio, MP3, text messaging, gaming, etc.), media streams, and the like. In one example, the headend 202 may generate and present (i.e., transmit, provide, pass, broadcast, send, etc.) the stream media DATA/KEYS_IN.

The network 204 is generally implemented as a media stream distribution network (e.g., cable, satellite, and the like) that is configured to selectively distribute (i.e., transmit and receive) media service provider streams (e.g., standard broadcast television and radio, digital television, HDTV, audio, MP3, text messaging, games, etc.) for example, as the stream to the STBs 206 and to the receivers 208, for example, as the stream VIDOUT. The stream DATA/KEYS_IN is generally distributed based upon (or in response to) subscriber information. For example, the level of service the client has purchased (e.g., basic service, premium movie channels, etc.), the type of service the client has requested (e.g., standard TV, HDTV, interactive messaging, video on demand, pay-per-view, impulse-pay-per-view, etc.), and the like may determine the media streams that are sent to (and received from) a particular subscriber.

The STB 206 is generally implemented as an STB having multiple stream capability (e.g., standard broadcast television and radio, digital television, audio, MP3, high definition digital television (HDTV), text messaging, etc.). The STB 206 generally comprises at least one respective security processor (e.g., the processor 100). The STB 206 may receive encrypted (and compressed) video and audio data (e.g., the media stream DATA/KEYS_IN), and present clear video and audio data (e.g., the stream VIDOUT) to the receiver 208.

Figure 2B:
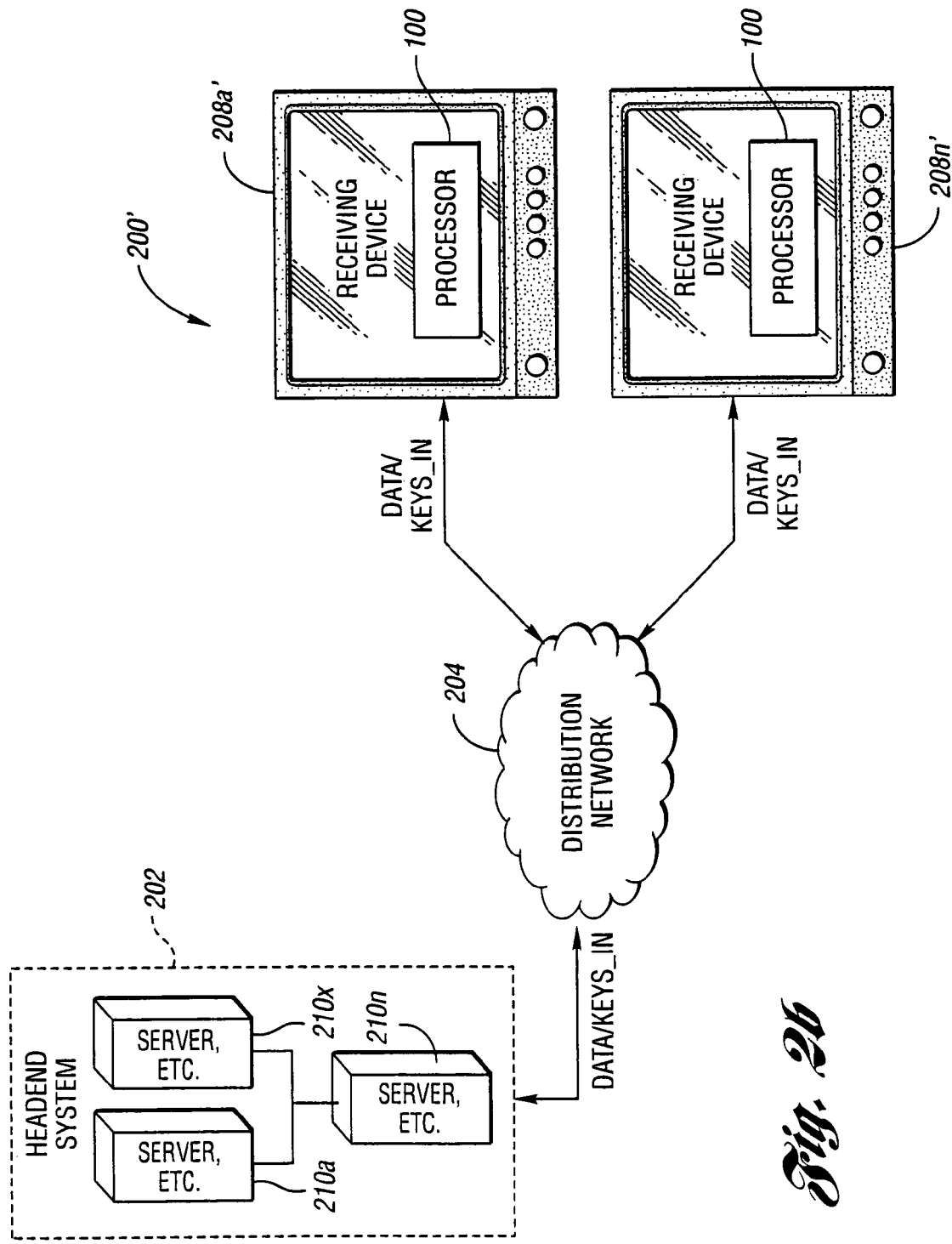

Referring to FIG. 2b, a diagram illustrating a media stream processing and distribution system 200' implemented in connection with the present invention is shown. The distribution system 200' generally comprises the headend 202, the network 204, and at least one of the receiving device (i.e., receiver, transceiver, etc.) 208' (generally a plurality of the devices 208'a-208'n). The receiving device 208' is generally coupled directly to the network 204 and receives the stream DATA/KEYS_IN. The receiving device 208' generally comprises at least one respective security processor (e.g., the processor 100).

In yet another example (not shown), the system 200' may be implemented having at least one STB 206 coupled to the network 204 and with at least one receiver 208 coupled thereto, as well as having at least one device 208 that is directly coupled to the network 204.

In yet another example (not shown), the system 200' may be implemented having at least one STB 206 coupled to the network 204 and with at least one receiver 208 coupled thereto, as well as having at least one device 208 that is directly coupled to the network 204.

As is readily apparent from the foregoing description, then, the present invention generally provides an improved system and an improved method for generation of variable ladder encryption/decryption keys. The processor of the present invention generally provides a variable key ladder that comprises a hardware acceleration with increased performance while providing re-configuration that is typically attributed to software in conventional approaches.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A decryption apparatus, comprising:
   a non-transitory computer-readable storage medium configured to store configuration data and at least some of a plurality of keys, wherein a first one of the keys is a symmetric device key and a second one of the keys is an asymmetric key;
   a key decryption operator configured to generate a third one of the keys as another device key by decrypting a data message using the second one of the keys, the data message being included in a data stream;
   a switch configured to select between the first one of the keys and the third one of the keys depending on the configuration data; and
   a decryption engine configured to decrypt at least a portion of the data stream using a key ladder that includes the selected first or third one of the keys.

2. The decryption apparatus of claim 1, wherein the key ladder includes at least one asymmetric key and at least one symmetric key.

3. The decryption apparatus of claim 1, wherein the configuration data indicates how many of the keys are to be included in the key ladder.

4. A method for decrypting a data stream, comprising:
   storing configuration data and at least some of a plurality of keys, wherein a first one of the keys is a symmetric device key and a second one of the keys is an asymmetric key;
   receiving, by a receiver, a data stream including a data message;
   generating a third one of the keys as another device key by decrypting the data message using the second one of the keys;
   selecting between the first one of the keys and the third one of the keys depending on the configuration data; and
   decrypting at least a portion of the data stream using a key ladder that includes the selected first or third one of the keys.

5. The method of claim 4, wherein the key ladder includes at least one asymmetric key and at least one symmetric key.

6. The method of claim 4, wherein the configuration data indicates how many of the keys are to be included in the key ladder.

7. The decryption apparatus of claim 1, wherein the data message is an Entitlement Management Message (EMM).

8. The method of claim 4, wherein the data message is an Entitlement Management Message (EMM).

9. The method of claim 4, further comprising receiving the configuration data as part of the data stream.

10. A decryption apparatus, comprising:
a non-transitory computer-readable storage medium configured to store configuration data, a symmetric first key that is a device key, a second key, and an asymmetric third key;
a key decryption operator configured to receive a data message and to generate a fourth key as another device key by decrypting the data message using the asymmetric third key;
a switch configured to select between the symmetric first key and the fourth key depending upon the configuration data, and also to select the second key so as to be used for decryption at a particular tier in a key ladder, wherein the particular tier also depends upon the configuration data; and
a decryption engine configured to decrypt at least a portion of a data stream using the key ladder that includes the second key at the particular tier and the selected one of the first and fourth keys.

11. The decryption apparatus of claim 10, wherein the data message is an Entitlement Management Message (EMM).

12. The decryption apparatus of claim 10, wherein the key ladder comprises at least one asymmetric key and at least one symmetric key.

13. The decryption apparatus of claim 10, wherein the key ladder comprises a single asymmetric key in a first tier of the key ladder, and further comprises a plurality of symmetric keys.

14. The decryption apparatus of claim 10, further comprising a receiver configured to receive the configuration data as part of the data stream.

15. A method, comprising:
receiving configuration data, a symmetric first key as a device key, a second key, and an asymmetric third key;
generating a fourth key by decrypting a received data message using the asymmetric third key;
selecting between the symmetric first key and a fourth key as another device key generated by decrypting a received data message using the asymmetric third key depending upon the configuration data;
selecting the second key so as to be used for decryption at a particular tier in a key ladder, wherein the particular tier also depends upon the configuration data; and
decrypting at least a portion of a data stream using a key ladder that includes the second key at the particular tier and the selected one of the first and fourth keys.

16. The method of claim 15, wherein the data message is an Entitlement Management Message (EMM).

17. The method of claim 15, wherein the key ladder comprises at least one asymmetric key and at least one symmetric key.

18. The method of claim 15, wherein the key ladder comprises a single asymmetric key in a first tier of the key ladder, and further comprises a plurality of symmetric keys.

19. The method of claim 15, further comprising receiving the configuration data as part of the data stream.

20. The decryption apparatus of claim 1, further comprising a receiver configured to receive the configuration data as part of the data stream.

* * * * *

UNITED STATES PATENT AND TRADEMARK OFFICE
CERTIFICATE OF CORRECTION

PATENT NO. : 7,933,410 B2
APPLICATION NO. : 11/058894
DATED : April 26, 2011
INVENTOR(S) : James William Fahrny Page 1 of 1

It is certified that error appears in the above-identified patent and that said Letters Patent is hereby corrected as shown below:

Column 1, Line 30:
Please delete "for-security" and insert --for security--

Column 9, Line 11:
Please delete "(e.g., HASH_ENABLE_ - HASH_ENABLE_n)" and insert
--(e.g., HASH_ENABLE_a - HASH_ENABLE_n)--

Signed and Sealed this
Third Day of April, 2012

David J. Kappos
*Director of the United States Patent and Trademark Office*